March 25, 1969  G. A. ELLIOTT ET AL  3,434,937
DISTILLATION PURIFICATION OF CRUDE SYNTHETIC METHANOL
Filed Oct. 6, 1966
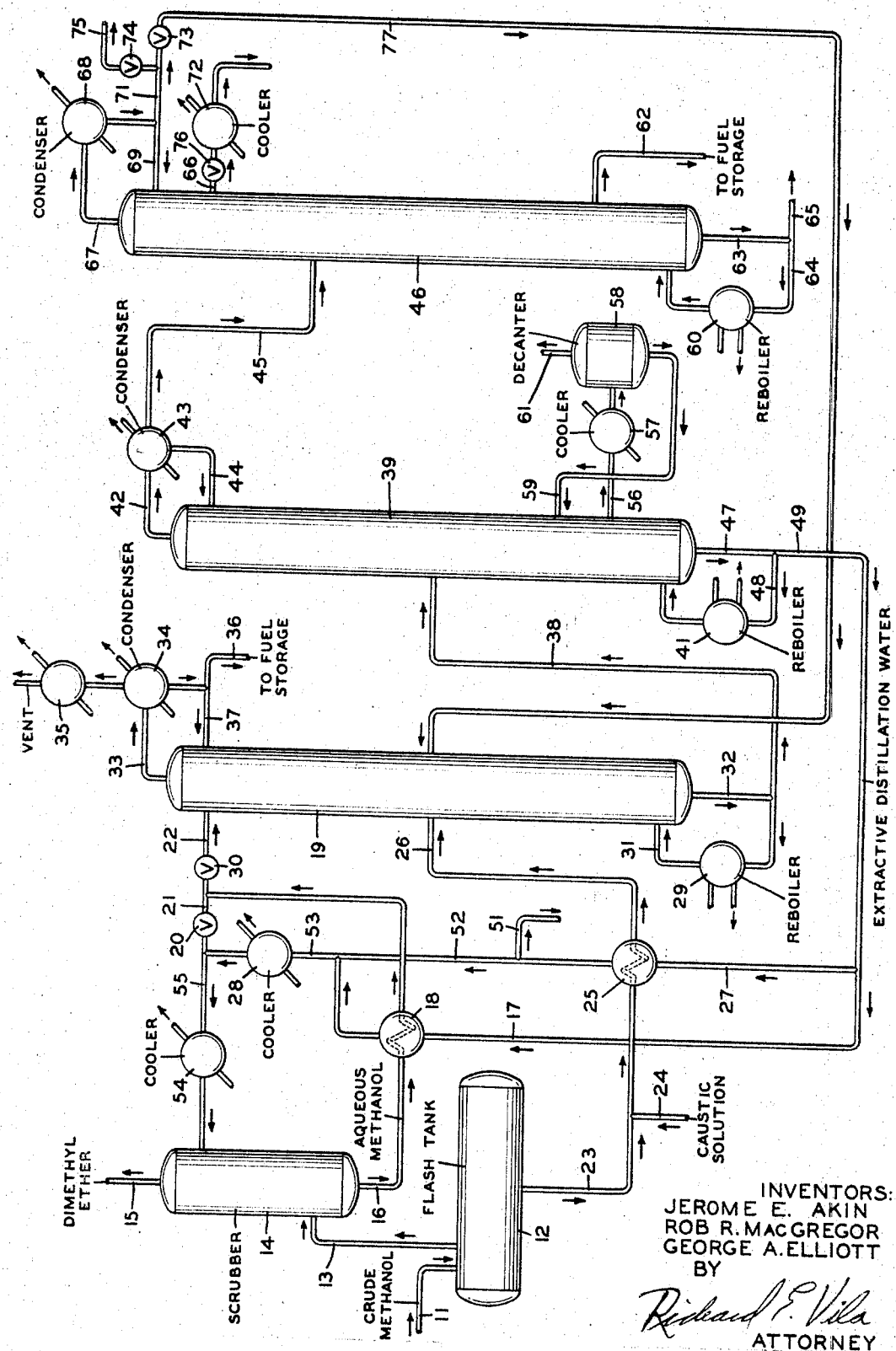
INVENTORS:
JEROME E. AKIN
ROB R. MacGREGOR
GEORGE A. ELLIOTT
BY
Richard E. Vila
ATTORNEY United States Patent Office 3,434,937
Patented Mar. 25, 1969

3,434,937
DISTILLATION PURIFICATION OF CRUDE SYNTHETIC METHANOL
George A. Elliott, Petersburg, Jerome E. Akin, Chester, and Rob R. MacGregor, Hopewell, Va., assignors to Allied Chemical Corporation, New York, N.Y., a corporation of New York
Filed Oct. 6, 1966, Ser. No. 584,746
Int. Cl. B01d 3/38
U.S. Cl. 203—79                                         11 Claims

ABSTRACT OF THE DISCLOSURE

Crude synthetic methanol is purified to at least 99.95% by flashing off volatile impurities and dissolved gases, extractively distilling by passing the crude methanol counter-current to water to produce aqueous methanol bottoms, distilling the aqueous methanol bottoms to produce methanol distillate containing higher alcohol impurities, and redistilling the distillate to produce 99.95% purer methanol.

---

This invention relates to the purification of synthetic methanol and more particularly to the purification of synthetic methanol to a high purity by separating out water, ethanol, and other organic impurities by means of an efficient distillation procedure.

There are several methods in use for purifying methanol. Most of these methods utilize extractive distillation as disclosed in British Patent 660,773, British Patent 958,828, and U.S. Patent 2,549,290.

At the present time there is an increasing demand for high purity methanol, and especially methanol of 99.95 percent purity. Analyses of methanol purified by available methods gave results which were not within the specified high purity limits. Specifically, the prior art processes do not sufficiently purify methanol so that the concentrations of methanol, ethanol and organics impurities are within the required limits. The problem is particularly acute with respect to ethanol, since the volatility of ethanol is very close to that of methanol.

In the prior art processes no provision is made for separating out the ethanol although means are provided for separating out the heavier alcohols and the other organic impurities. The ethanol is not withdrawn with the liquid side-stream bleed withdrawn from either the first or second distillation zones at the lower section of the zones as taught by the prior art processes, since the ethanol does not concentrate at that section of the zones because of its high volatility. Only the high boiling alcohols and organic impurities concentrate at the lower section of the zones and are taken out by the side-stream bleeds.

Little ethanol is separated out from the methanol by the extractive distillation. Furthermore, a small amount of the ethanol is separated from the methanol by distillation in the second distillation zone or column used in the prior art processes, since most of the water is separated out in the second zone to form aqueous bottoms which force most of the ethanol along with the methanol to the top of the zone. Thus, a relatively large portion of the ethanol in the crude methanol feed is to be found in the methanol product.

It can also be appreciated that removal of the last few fractions of a percentage of impurities in methanol is the most difficult.

It is one object of this invention to provide a new and improved process whereby high purity anhydrous methanol may be produced.

It is another object of this invention to produce a high purity methanol without excessive loss of product methanol by means of an improved process utilizing an extractive distillation procedure.

It is a further object of this invention to separate out from the product methanol, the organic and particularly the ethanol impurities without excessive loss of methanol.

It is an additional object of this invention to produce high purity methanol, of at least 99.95% purity, by a distillation process with good heat economy.

Other objects and advantages of the present invention will be evident from the following description of the invention and accompanying drawing.

In accordance with the present invention there is provided a process for purifying crude methanol obtained from a methanol catalytic synthesis containing as impurities, constituents more and less volatile than methanol and a small amount of unsaturated and saturated liquid hydrocarbons as by-product oily material which process comprises, introducing said crude methanol into a first distillation zone and passing the same therein counter-current with water to extractively distill said methanol and produce an aqueous methanol solution as bottoms and a distillate comprising an uncondensed vaporous portion containing dimethyl ether and a liquid portion containing high and low boiling impurities; venting-off the uncondensed vaporous portion of said distillate; returning at least a major portion of the liquid distillate to said first distillation zone as reflux while withdrawing a liquid stream to remove high and low boiling impurities from said first zone; passing the aqueous methanol bottoms produced in said first zone to a second distillation zone to separate water from the methanol and produce a dilute aqueous bottom and a distillate rich in methanol containing higher alcohols including ethanol as impurities; dividing said distillate into a condensed major portion and a minor portion; returning the condensed distillate to said second zone as reflux; introducing the minor portion of said distillate from said second zone into a third distillation zone to form bottoms containing organic impurities including ethanol and produce a distillate rich in methanol; withdrawing and discharging a portion of said bottoms from the third zone to remove ethanol and other organic impurities from the process; condensing distillate from said third zone; returning the major portion of said condensed distillate from the third zone to said zone as reflux; and withdrawing the minor portion of the said third zone condensed distillate as high purity methanol product containing at least 99.95 weight percent methanol.

The accompanying drawing is a flow sheet diagrammatically illustrating the process that is the preferred embodiment of the invention. Referring to the drawing a stream consisting of the crude methanol from catalytic synthesis passes from line 11 into crude methanol product tank 12 maintained at a pressure in the range of about 0–100 p.s.i.g. and preferably between 0 to 50 p.s.i.g. The crude methanol is flashed in tank 12 and releases through line 13 most of the dissolved gases (methane, nitrogen etc.), dimethyl ether, and some methanol. These vapors are scrubbed with recycled water in scrubber column 14 to recover or absorb the methanol. The dimethyl ether and previously dissolved gases are vented-off through line 15.

The aqueous methanol collecting at the bottom of column 14 passes through line 16 and is heated by the stream flowing through line 17 in heat exchanger 18 generally to about 40–100° C. and preferably between about 60–80° C. to approximately correspond to the temperature at the top of extractive distillation column or zone 19. The stream in line 16 is combined with the recycled water in line 21 to form the stream passing through line 22 into the top of distillation zone 19 with a methanol concentration generally between 0–20 and preferably 2–10 percent by weight.

Crude methanol liquid passing from tank 12 in line 23 is mixed with the caustic passing through line 24 to neutralize acids formed in the synthesis. The combined streams in line 16 pass through heat exchanger 25 and are heated by recycled water to the temperature at the center section of the first distillation zone 19, which temperature is generally between 50–100° C. and preferably between 60–80° C. The methanol feed in line 26 is then passed to the center section of zone 19. Zone 19 is maintained, generally at 0–100 p.s.i.g. and preferably 0–50 p.s.i.g.

Hot recycled water along with the aqueous methanol solution from scrubber column 14 is passed through line 22 into the upper section of distillation zone 19 generally in a weight ratio of 1–5 parts of water to 1.0 part of crude methanol feed entering the zone and preferably in a weight ratio of 2.0 to 3.5. The stream in line 22 is preferably introduced 3 to 4 plates below the top of distillation zone 19 so as to not interfere with the rectification at the top of the zone.

The solvent water in line 22 enters the first distillation zone 19 and passes down the zone absorbing methanol from the rising vapors. The presence of large amounts of water alters the volatilities of low and high boiling impurities relative to methanol and as a result the predominant portion of such impurities except for traces of low boilers and a portion of the high boilers, are removed overhead in line 33 which distillate is generally at about 60–80° C. and preferably at about 60–70° C. The vapors in line 33 are partially condensed in cooler 34 and then further cooled to preferably about 20–35° C. in cooler 35. Dimethyl ether and other uncondensed gases with minor amounts of methanol are vented from cooler 35 so as to purge the system of these impurities. A portion of the liquid condensate corresponding to generally about 0.5–5.0 weight percent and preferably about 1.0 to 3.5 weight percent of the crude feed is removed through line 36 to be stored as fuel so as to rid the system of the low and high boiling impurities that have been concentrated in the distillate. The remaining condensed distillate which is in the weight ratio of generally about 15:1 to 30:1 and preferably about 22:1 to 28:1 to the portion of distillate that was purged is returned through line 37 to zone 19 as reflux. Thus, distillation zone 19 is utilized to extract from the crude methanol most of the low boiling impurities and a portion of the high boiling impurities that are present.

The aqueous bottoms from zone 19 which contain generally from about 10–50 and preferably from about 15–35 weight percent methanol are generally at a temperature of about 60°–120° C. preferably at 70–90° C. The bottoms are passed out of zone 19 in line 32 and then divided into two streams. One stream is passed through line 31 and reboiler or heat exchanger 29 to vaporize some of the liquid to form stripping vapor which is passed back through line 31 into the lower section of zone 19. The other stream is passed through line 38 into the center section of the second distillation zone 39 which is maintained generally at 0–100 p.s.i.g. preferably 0–50 p.s.i.g.

The second distillation zone 39 separates the bulk of the water from the methanol. Furthermore, a liquid sidestream is withdrawn from the lower section of the zone to separate out the higher alcohols and organic impurities that accumulate at the lower section of zone 39. It is preferable to produce aqueous bottoms in distillation zone 39 which are substantially pure water since the aqueous bottoms are to be used as solvent water in the first distillation zone 19 and as wash water in scrubber 14. However, 0–15 percent methanol in the bottoms is allowable.

The composition of the distillate from zone 39 is important to the recovery of methanol of desired high purity without excessive or inefficient loss of methanol. The presence of minimum quantities of alcohols in the distillate is desirable in obtaining a high purity product without excessive loss of product methanol. Therefore, it is desirable that the distillate contains at least 0.2 percent higher alcohol impurities ranging up to as much as 3.0 percent or even somewhat greater, preferably between 0.3 to 2.0 percent by weight of the higher alcohols of which at least 0.2 percent is ethanol. The amount of water in the distillate may vary fairly widely and still produce good results. Generally, the amount of water may range from negligible quantities up to as much as 10 percent. The less the water content of the fed passed to zone 46 for distillation the larger the amount of methanol product that will be purified in zone 46 and the smaller the amount of bottoms that will be purged from zone 46 to rid the system of alcohol impurities and water. Excessive amounts of water in the feed to zone 46 results in the bottom of zone 46 having too high a water content which results in an increase in the ethanol content of the distillate from zone 46 to above the maximum limit. Generally the amount of water in the zone 39 distillate will vary between 0.5–6.0 percent under the more preferred conditions of operation.

The bottoms from the second distillation zone 39 which are maintained generally at 70°–130° C. and preferably at 90–110° C. are withdrawn through line 47. The bottoms stream passing through line 47 contains about 0–15 percent methanol and correspondingly 85–100 percent water with minor amounts of higher alcohols and other organic impurities. The bottoms withdrawn through line 47 are divided into two portions. One portion is passed through line 48 and reboiler 41 where liquid bottoms are vaporized. The vapor is then passed through line 41 into the lower portion of distillation zone 39 to form stripping vapor for zone 39. The other portion of the bottoms is recycled through line 49 to be used in the first distillation zone 19.

The liquid stream in line 49 is preferably further divided into two portions which are passed respectively into lines 17 and 27. The stream passing through line 27 is first used to pre-heat the crude methanol feed passing through line 23 to the temperature existing at the center section of the first distillation zone 19. A portion of the stream passing through line 27 is then withdrawn from the system through line 51 to remove dissolved organic salts, inorganic compounds, and water not needed for the extractive distillation in zone 19. The other portion of the stream is passed through line 17 and used to pre-heat the aqueous methanol solution stream passing from scrubber 14 through line 16, to the temperature at the upper section of zone 19. The cooled recycled water streams in lines 17 and 52 are then combined in line 53 and further cooled in cooler 28 to the temperature at the top of zone 19. Then a portion of the combined streams in line 53 may be diverted through line 55, cooled to about 30° C. in cooler 54, and passed to the top of scrubber 14 as wash water. The remaining portion of recycled water in line 53 is passed through line 21 by valve 20 and then is combined with the pre-heated aqueous methanol in line 16. The combined streams pass as solvent water through line 22 by valve 30 to the top of the first distillation zone 19.

Different arrangements of heat exchanges and coolers for conserving heat in the process may be selected in place of exchanger units 18, 25, 28, and 54, as illustrated on the drawing. One alternative would be to eliminate exchanger 18 entirely and to heat the stream in line 16 by direct mixing with the stream in line 17. However, the arrangement illustrated on the drawing is preferred.

High boiling impurities, largely N-butanol and isobutanol concentrate in the lower section of zone 39 at a point where the temperature is generally 10–30° C. and preferably 15–25° C. below the bottoms. A continuous side-stream is withdrawn at this point through line 56, cooled to 30° C. or lower in cooler 57 and pased into decanter 58. The stream in line 56 consists typically of 55–75 percent water, 30–35 percent oils and higher alcohols, and 1–10 percent methanol. This liquid is separated into two liquid layers in decanter 58. The largely water insoluble upper layer, consisting chiefly of higher alcohols and oils with small amounts of water and methanol is withdrawn through line 61. The lower layer consisting of water, methanol and small amounts of high boiling impurities, is preferably returned to zone 39 through line 59 a few plates above the point of withdrawal of the original stream through line 56. Alternately, the lower layer may be passed to some other suitable part of the system such as the crude methanol feed to the first distillation zone 19.

It is to be noted that the side-stream bleed is taken in zone 39 instead of zone 19 as is often proposed by prior art workers. In our process it is preferable to take the side-stream bleed in zone 39, since the liquids in the lower section of zone 19 contain much more methanol than the liquids in the lower section of zone 39. The more methanol there is in the side-stream bleed the more methanol will pass out of the system in the upper layer that separates out. Thus, considerably more methanol is preserved when the side-stream bleed is taken from zone 39.

Vaporous distillate containing mainly methanol with small amounts of water, ethanol and trace amounts of low and high boiling impurities passes from the top of zone 39 into line 42 at a temperature of generally 60–90° C. and preferably 65–75° C. The vaporous distillate is partly condensed as it passes through condenser 43 to form liquid condensate which is generally 50–90 percent and preferably 65–85 percent of the total distillate. The condensate is then passed back through line 44 to zone 39 as reflux and the vaporous distillate is passed through line 45 to the central section of the third distillation zone 46 at a point where the vapor composition leaving the plate liquid closely matches its composition. Alternately, the distillate may be completely condensed and a minor portion of the liquid distillate may then be fed to zone 46. The third distillation zone is maintained generally at 0–100 p.s.i.g., preferably at 0–50 p.s.i.g.

Water, ethanol and remaining high boiling alcohols are concentrated in the bottoms of zone 46. The aqueous bottoms withdrawn through line 63 containing typically 30–90 percent methanol, 1–20 percent higher alcohols including ethanol, 0.5 percent other organics, and less than 50 percent water are divided into two streams. The major stream passes through line 64 and reboiler 60 where some of the liquid is evaporated to form stripping vapor which is returned to the bottom of zone 46 through line 64. Reboiler 60 maintains the bottoms at a temperature of generally about 65–110° C. and preferably at 75–90° C. Ethanol and higher alcohol impurities are discharged from the process by withdrawing a portion of the bottoms of zone 46. This is preferably accomplished as shown by withdrawing through line 65 a minor stream which is generally 0.2–25.0 percent and preferably 1.3–14.0 percent of the feed passing into zone 46 through line 45 to discharge water, higher alcohols including ethanol and other remaining impurities from the system.

If the water concentration in the bottoms of zone 46 exceeds 50 percent, the ethanol does not concentrate in the bottoms but further up in zone 46. In conjunction with the withdrawal of the bottoms a small continuous sidestream may be withdrawn at that point in zone 46 where the ethanol and the remaining organic impurities tend to concentrate and passed through a line such as line 62 to fuel storage so as to purge the system of ethanol and high boiling organic impurities.

If the amount of low boiling impurities in the feed stream passing through line 45 is negligible then the overhead distillate of the third distillation zone 46 will be at least 99.95 percent methanol. Valve 76 is closed so that no liquid will pass through line 66. The overhead distillate passes through line 67 at a temperature of about 40–90° C. and preferably at 55–80° C. and is totally condensed in condenser 68. The liquid condensate is then divided into two portions generally in the weight ratio of 6.0:1.0 to 2.0:1.0 and preferably 4.0:1.0 to 5.0:1.0. The major portion of the liquid distillate is then passed through line 69 and returned to the upper portion of zone 46 as reflux. The minor portion passes through line 71, and down line 75, since valve 73 is closed and valve 74 is open. The minor portion is collected from line 75 as product methanol condensate containing at least 99.95 percent methanol.

Alternatively, if the feed stream passing through line 45 into zone 46 contains a substantial quantity of low boiling impurities then the top two or three plates in zone 46 are operated under almost total reflux conditions, so as to form a concentration zone for the trace low boilers. The overhead distillate passes through line 67 and is completely condensed in condenser 68. The condensate is divided into a major and minor portion in which the minor portion constitutes 0.1–0.4 weight percent of the total condensate. The major portion is passed back to the top of zone 46 through line 69 as reflux. A purge of the low boiling impurities is achieved by passing the minor portion through lines 71 and 77 back to the central section of the first distillation zone 19 where most of the low boiling impurities are removed from the system. Valve 73 is kept open while valve 74 is closed.

Liquid product is withdrawn from the third zone 46 through line 66 by valve 76 from the liquid on the second to the tenth plate below to the top of the zone and preferably from about the fourth to the sixth plate below the top of the zone. The total amount of the streams withdrawn through lines 71 and 66 are generally in a weight ratio with reflux returned to zone 46 through line 69 of 1.0:6.0 to 1.0:2.0, perferably 1.0:4.0 to 1.0:5.0.

The highly purified anhydrous methanol product stream passing through line 66 by valve 76 is cooled to 30° C. in cooler 32. The product methanol containing better than 99.95 percent methanol may then be passed through a bed of strong cation type ion exchange resin where any trace oxygen or nitrogen bearing impurities are removed, as is conventional. The efficiency of the above-described process is such that generally at least 90 and preferably 95–99 weight percent of the methanol in the crude feed passed to the process is recovered as product.

The example given below is one illustration of the process that constitutes the invention.

EXAMPLE 1

Referring generally to the accompanying drawing, crude methanol feed from commercial synthesis was first reduced to atmospheric pressure and then it was mixed with caustic so as to neutralize the free acids in it. The composition of the crude methanol was as follows:

*Crude synthetic methanol*

| | Parts by wt. |
|---|---|
| Methanol | 87.7 |
| Dimethyl ether | 1.14 |
| Iso-butanol | 0.77 |
| Ethanol | 0.29 |
| n-Butanol | 0.028 |
| Iso-propanol | 0.001 |
| Other organic compounds | 0.253 |
| Water | 9.82 |

The crude methanol feed was then passed to an extractive distillation zone or column which has an upper section of 20 plates and a lower 12 foot section packed with ½ inch ceramic Berl saddles, and which is equivalent to about 17 plates. The crude methanol was fed to the bottom plate of the upper section at a temperature of about 66° C. Water was fed to the 17th plate of the upper section at a temperature of about 66° C. and at a weight ratio of 2.8 parts water to 1.0 part crude methanol feed.

Distillate vapors from the first distillation or extractive zone which were at about 61.5° C., were partly condensed by passing them through a cooler using 8 to 10°

C. cooling water. The uncondensed vapors consisting primarily of dimethyl ether and methanol were vented to the atmosphere. Then the condensed distillate was divided into a major and minor portion, the major portion being in a weight ratio of 25.0 to 1.0 with the minor portion. The major portion was returned to the distillation zone as reflux and the minor portion was withdrawn and purged from the system so as to rid the system of high and low boiling impurities. The minor portion of the condensed distillate was 3.1 weight percent of the crude methanol feed. The condensed distillate had the following composition:

| | Parts by wt. |
|---|---|
| Methanol | 94.87 |
| Dimethyl ether | 0.83 |
| Iso-butanol | 0.94 |
| n-Butanol | 0.27 |
| Iso-propanol | 0.05 |
| Other organics | 3.04 |

The bottoms from the first or extractive distillation zone were vaporized in a reboiler at 82.5° C. and returned to the bottom of the zone as stripping vapor.

An aqueous methanol bottoms stream from the first distillation zone containing 30 weight percent of methanol was passed through a heat exchanger and fed continuously at 80° C. into the central section of the second distillation zone. The aqueous methanol was introduced on the bottom plate of the upper section. The second zone has a 19 plate upper section, while the lower section is packed with 12 ft. of ½-inch ceramic Berl saddles. Furthermore, methanol was stripped in the lower portion of the second zone so that the methanol concentration of the bottoms was about 9.0 weight percent. The reboiler for the second zone maintained the temperature of the bottoms at 98° C. A portion of the bottoms was withdrawn from the second zone and continuously recycled to the top of the first distillation zone as extractive solvent.

The methanol liquid solution was rectified in the upper section of the second zone and distilled overhead at 65.5° C. The distillate vapor was partly condensed to form a liquid and vapor portion. The liquid portion was returned to the top of the second zone to provide reflux while the vaporous distillate was withdrawn and fed to the central section of the third distillation zone. The weight ratio of distillate returned as reflux to that withdrawn and fed to the third zone was 4.0 to 1.0. Composition of the distillate from the second zone was:

| | Parts by wt. |
|---|---|
| Methanol | 95.6 |
| Dimethyl ether | 0.0001 |
| Iso-butanol | 0.7 |
| Ethanol | 0.256 |
| n-Butanol | 0.0098 |
| Sec-butanol | 0.0049 |
| Other organics | 0.0089 |
| Water (by difference) | 3.4203 |

The vaporous distillate from the second zone was fed continuously to the 25th plate from the bottom of the 55 plate third zone at a temperature of about 67° C. The vaporous distillate from the third zone was totally condensed at 64.5° C. and divided into a major and minor portion. The major portion which was at weight ratio of 4.0 to 1.0 with the minor portion was returned to the third zone as reflux and the minor portion was withdrawn as purified product. The bottoms from the third zone were reboiled at about 78° C. to strip out methanol and a bottoms side-stream which represented 8.0 weight percent of the feed was continuously withdrawn and purged to bleed out water, ethanol, and the other remaining impurities from the system. The purified methanol distillate representing 92.0 weight percent of the feed to the third zone was cooled to 30° C. and withdrawn as product. The compositions of the distillate and bottoms were as follows:

| | Distillate | Bottoms |
|---|---|---|
| Methanol | 99.99% | 45.1% |
| Dimethyl Ether | 2 p.p.m. | 2 p.p.m. |
| Ethanol | 4 p.p.m. max | 2.8% |
| Iso-butanol | 2 p.p.m. max | 8.8% |
| Other organics | 19 p.p.m. max | 0.101% |

The over-all yield of methanol recovered as product from the process with respect to the crude methanol fed to the process was about 92.7 weight percent. The flash tank, the scrubber, and the three distillation columns were operated at substantially atmospheric pressure.

The illustrations of the method that constitutes the invention given above are not intended to limit the invention in any way but are merely descriptive of the method. All modifications which fall within the spirit of the present invention are claimed as part of the present invention.

We claim:
1. A process for purifying methanol obtained from a crude methanol catalytic synthesis containing as impurities constituents more and less volatile than methanol and a small amount of unsaturated and saturated liquid hydrocarbons as by-product oily material which comprises:
(a) introducing the crude methanol into a low pressure zone in which dissolved gases are flashed off and scrubbed with water to recover an impure aqueous methanol, introducing said impure methanol into a first distillation zone and passing the same therein countercurrent with water to extractively distill said methanol and produce an aqueous methanol solution as bottoms and a distillate comprising an uncondensed vapor portion containing dimethyl ether and a liquid portion containing high and low boiling impurities;
(b) venting-off the uncondensed vapor portion of said distillate;
(c) returning at least a major portion of the liquid distillate to said first distillation zone as reflux while withdrawing a minor portion of said liquid distillate to remove high and low boiling impurities;
(d) passing the aqueous methanol bottoms produced in said first zone to a second distillation zone to separate water from the methanol and produce a dilute aqueous bottoms and a distillate rich in methanol containing higher alcohols including ethanol as impurities;
(e) dividing said methanol-rich distillate into a minor portion and a condensed major portion;
(f) returning said condensed major portion of the methanol-rich distillate to said second zone as reflux;
(g) introducing the minor portion of said methanol-rich distillate from said second zone as feed into a third distillation zone to form a bottoms containing organic impurities including ethanol and produce a second distillate rich in methanol;
(h) withdrawing and discharging a portion of said bottoms from the third zone to remove ethanol and other organic impurities from the process;
(i) condensing said methanol-rich distillate from said third zone;
(j) returning a major portion of said condensed methanol-rich second distillate to said third zone as reflux; and
(k) withdrawing a minor portion of the condensed methanol-rich second distillate as high purity product methanol containing at least 99.95 weight percent methanol.

2. A process as set forth in claim 1 in which the distillate from the second distillation zone contains 0.5–6.0 weight percent water and 0.3 to 2.0 weight percent higher alcohols including ethanol as impurities.

3. A process as set forth in claim 1 in which crude methanol is extractively distilled with water in the first distillation zone at a ratio of 2.0–3.5 parts of water to 1 part of crude methanol feed; in which the condensed distillate from the first distillation zone is divided into two streams of respective weight ratio of 20:1 to 30:1; in which the larger of said two streams is returned as reflux while the smaller stream is withdrawn from the process; and in which aqueous methanol solution containing 15 to 35 weight percent methanol is obtained as bottoms from the first distillation zone.

4. The process of claim 1 in which the bottoms in the third distillation zone is an aqueous solution containing 30 to 90 weight percent methanol; in which said bottoms are withdrawn and divided into a first stream representing 0.2 to 25.0 weight percent of the feed going into said third zone and a second stream; in which said first divided stheam is discharged from the process to remove water, ethanol, and other organics including higher alcohols; and in which the second divided bottoms stream is heated and vaporized before it is returned to the lower portion of said third zone.

5. A process as set forth in claim 1 in which about 65–85 weight percent of the distillate from the second distillation zone is condensed and returned to the zone as reflux while the rest of the distillate is passed as vapor to the central section of the third distillation zone.

6. A process as set forth in claim 1 comprising the additional steps of: taking a liquid sidestream from said second distillation zone at a point where the temperature is about 10–25° C. below the temperature at the bottom of the second zone; cooling and separating said sidestream liquid into a top layer containing higher alcohols and oils and a lower layer containing water and methanol; and withdrawing said top layer from the process.

7. A process as set forth in claim 1 wherein said second methanol-rich distillate is taken from a plate below the top plate in said third distillation zone; wherein the overhead distillate from the plates above the point of withdrawal of said second methanol-rich distillate is condensed and returned to said zone as reflux to concentrate the remnants of the low boiling impurities at the top of the third zone; and wherein a minor portion of the total of said overhead distillate is withdrawn to remove low boiling impurities from said third zone.

8. The process of claim 7 wherein said minor portion of said overhead distillate represents about 0.1–0.4 weight percent of the total overhead distillate and is passed as condensed liquid distillate to the first distillation zone.

9. A process as set forth in claim 1 in which the crude methanol feed is passed from synthesis into a zone of lower pressure of about 0–100 p.s.i.g. in which dissolved gases are flashed off; in which said flashed off vapors are scrubbed with water to recover entrained methanol, as an aqueous methanol solution; and in which said aqueous methanol solution is introduced into the upper section of the first distillation zone.

10. A process as set forth in claim 9 in which the bottoms from the second distillation zone consisting mainly of water and having a methanol concentration of up to 15 weight percent are used to pre-heat the crude methanol feed to the first distillation zone and the aqueous methanol solution from said scrubbing; in which a portion of said bottoms stream from the said second zone is thereafter discarded to purge the system of excess water and inorganic salt impurities; in which another portion is employed as wash water in said scrubbing; and in which a third portion is passed as solvent water to the first distillation zone.

11. A process for purifying methanol obtained from a methanol catalytic synthesis containing as impurities constituents more and less volatile than methanol and a small amount of unsaturated and saturated liquid hydrocarbons as by-product oily material which comprises:

(a) passing crude methanol feed from synthesis into a zone of lower pressure of about 0–100 p.s.i.g. in which dissolved gases are flashed off and scrubbed with water to recover entrained methanol as an aqueous methanol solution, and in which said aqueous methanol solution is introduced into the upper section of the first distillation zone;

(b) introducing said crude methanol from said low pressure zone into a first distillation zone and passing the same therein counter-current with water and aqueous methanol at a ratio of 2.0–3.5 parts of water per part of crude methanol feed to extractively distill said methanol and produce an aqueous methanol solution as bottoms containing 15 to 35 weight percent methanol and a distillate comprising an uncondensed vaporous portion containing dimethyl ether and a liquid portion containing high and low boiling impurities;

(c) venting-off the uncondensed vaporous portion of said distillate;

(d) dividing the liquid portion of the distillate of said first zone into two streams of respective weight ratio of 20:1 to 30:1, in which the larger stream is returned as reflux while the smaller stream is withdrawn from the process;

(e) passing the aqueous methanol bottoms produced in said first zone to a second distillation zone to separate water from the methanol and produce aqueous bottoms containing up to 15 weight percent methanol and a distillate rich in methanol containing about 0.5–6.0 weight percent water and 0.3–2.0 weight percent higher alcohols including about 0.2 weight percent ethanol as impurities;

(f) cooling said methanol-rich distillation so as to condense 65–85 weight percent of it;

(g) returning said condensed methanol-rich distillate to said second zone as reflux;

(h) taking a liquid side-stream from the second distillation zone at a point where the temperature is about 10–25° C. below the temperature at the bottom of the second zone, cooling and separating said sidestream liquid into a top layer containing higher alcohols and oils and a lower layer liquid containing water and methanol and returning the lower liquid layer to said second zone;

(i) taking the aqueous bottoms from the second distillating zone and using them to pre-heat the crude methanol feed being introduced into the first distillation zone and the aqueous methanol solution obtained by scrubbing said flashed-off gases;

(j) discarding a portion of said aqueous bottoms from the second distillation zone so as to purge the system of excess water and inorganic salt impurities, while passing another portion of said aqueous bottoms as wash water for scrubbing said flashed-off gases, and passing the remaining portion of said aqueous bottoms as solvent water to the first distillation zone;

(k) introducing uncondensed distillate from the second distillation zone into a third distillation zone to form an aqueous bottoms containing organic impurities including ethanol and produce a second methanol-rich distillate;

(l) dividing the aqueous bottoms from the third distillation zone which contains 30 to 90 weight percent methanol into a stream representing 0.2 to 25.0 weight percent of the feed going into said third zone, discharging said stream from the process to remove ethanol and other organic impurities from the systems, and heating the remaining portion of the bottoms and returning it to the said third zone;

(m) condensing all the overhead distillate from the third distillation zone and dividing it into a minor and major portion in which the minor portion of said distillate represents about 0.1–0.4 weight percent of the total distillate;

(n) passing said minor portion back to the first distillation zone;
(o) passing the major portion of said distillate back to the third distillation zone as reflux; and
(p) withdrawing liquid from a location just below the point of release of the overhead distillate in the third distillation zone as product methanol containing at least 99.95 weight percent methanol.

References Cited

UNITED STATES PATENTS

| | | | |
|---|---|---|---|
| 2,549,290 | 4/1951 | Congdon et al. | 203—85 X |
| 2,551,584 | 5/1951 | Carlson et al. | 203—53 X |
| 2,910,412 | 10/1959 | Muller et al. | 203—84 X |
| 2,993,840 | 7/1961 | Poincet | 203—82 X |
| 3,011,954 | 12/1961 | Halpern et al. | 203—85 |
| 3,239,435 | 3/1966 | Conseiller et al. | 260—643 X |
| 3,282,802 | 11/1966 | Clark | 203—84 X |

FOREIGN PATENTS

| | | |
|---|---|---|
| 660,773 | 11/1951 | Great Britain. |
| 967,884 | 9/1964 | Great Britain. |

NORMAN YUDKOFF, *Primary Examiner.*
F. E. DRUMMOND, *Assistant Examiner.*

U.S. Cl. X.R.

203—83, 95; 260—617, 643